United States Patent [19]

Plugge

[11] 4,305,335
[45] Dec. 15, 1981

[54] ENDLESS CONVEYOR FOR TRANSPORTING ROLL CONTAINERS

[75] Inventor: Jacobus P. E. H. Plugge, Voorburg, Netherlands

[73] Assignee: Staat der Nederlanden (Staatsbedrijf der Posterijen, Telegrafie en Telefonie), The Hague, Netherlands

[21] Appl. No.: 39,163

[22] Filed: May 15, 1979

[30] Foreign Application Priority Data

May 16, 1978 [NL] Netherlands .......................... 7805274

[51] Int. Cl.³ .............................................. B60S 3/04
[52] U.S. Cl. .................. 104/172 B; 104/39; 104/40; 198/472
[58] Field of Search ............... 104/165, 139, 130, 140, 104/172 B; 198/472, 648

[56] References Cited

U.S. PATENT DOCUMENTS

| | | | |
|---|---|---|---|
| 1,986,413 | 1/1935 | Rwemelin | 104/1 A |
| 3,772,994 | 11/1973 | Juarbe | 104/140 |
| 3,930,276 | 1/1976 | Van Brakel | 104/172 B |

*Primary Examiner*—Richard A. Bertsch
*Attorney, Agent, or Firm*—Hugh Adam Kirk

[57] ABSTRACT

Endless conveyor for transporting roll containers of which two wheels are located on one fixed axis and the other wheels are swivelling. The supporting surface of the conveyor is at about the same height as the floor on which the containers can roll or be wheeled. In cross-section the supporting surface has the shape of a channel, in consequence of which the wheels on the fixed axis can be transversely fixed, so that their axes are placed lengthwise over the channel.

8 Claims, 5 Drawing Figures

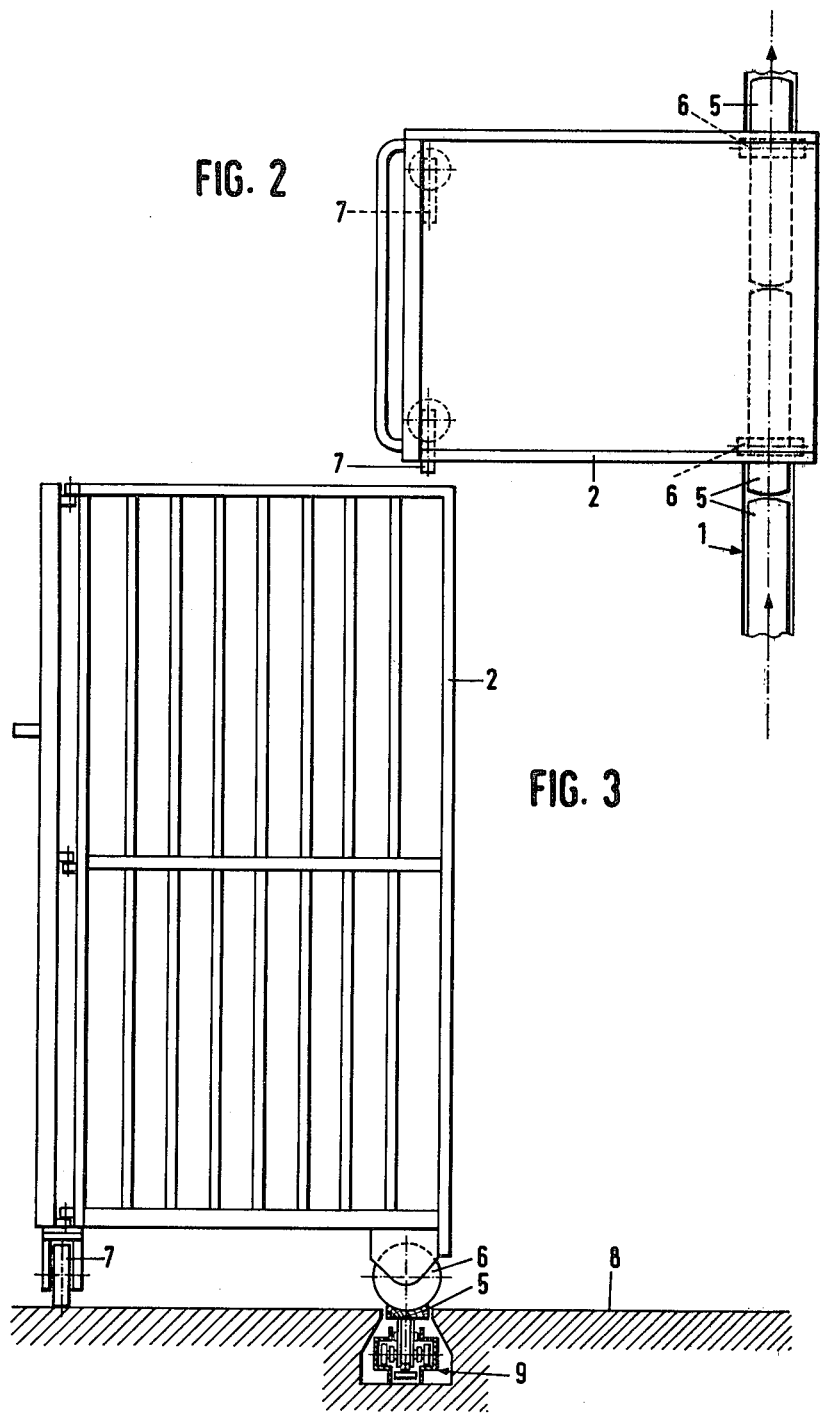

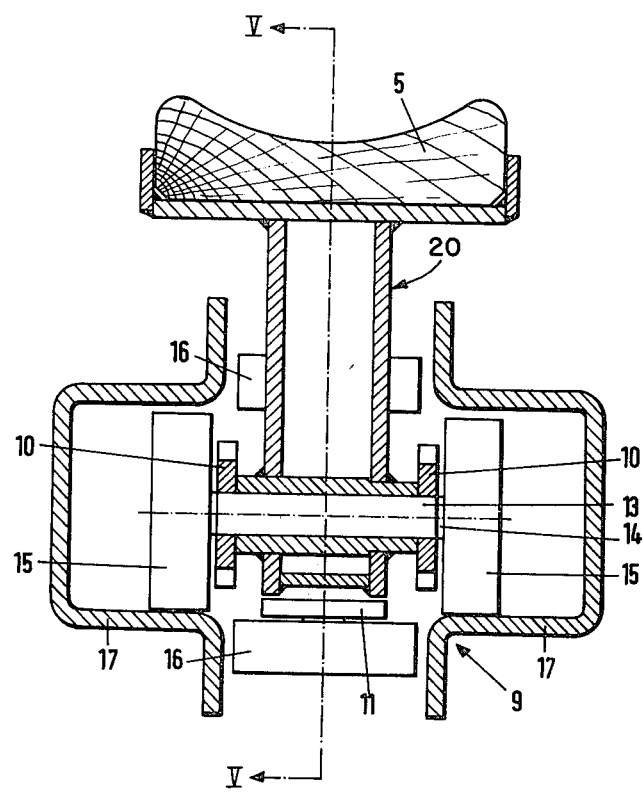

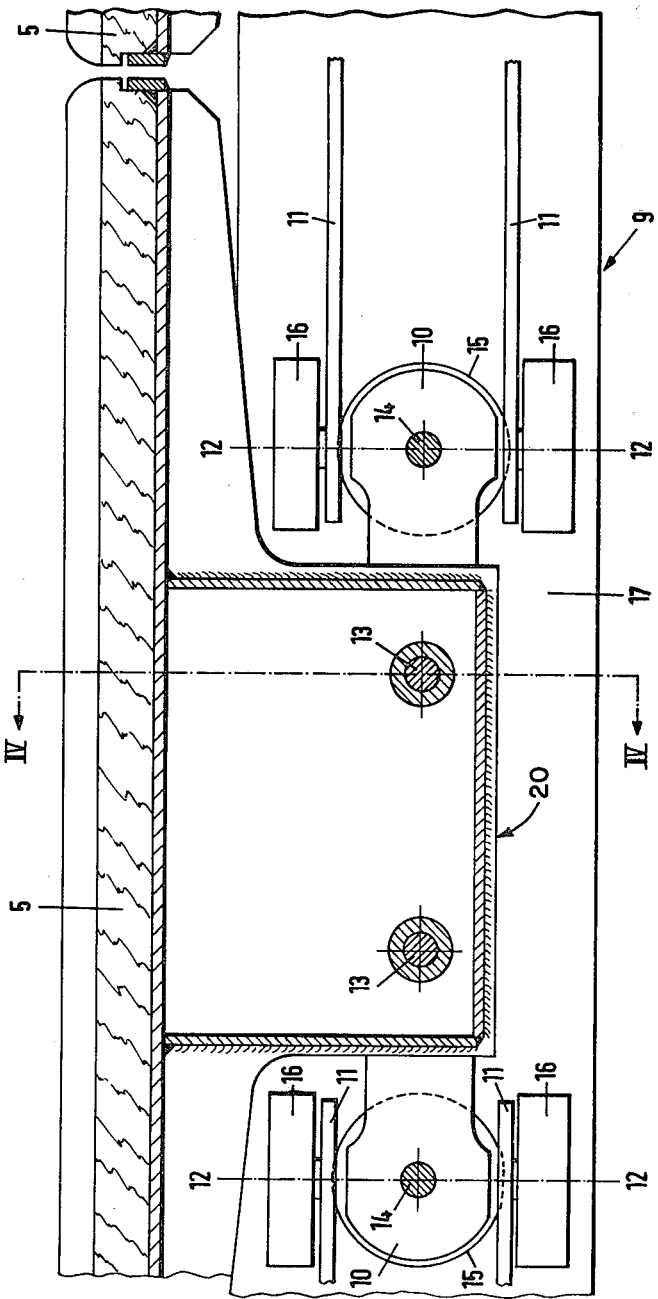

ENDLESS CONVEYOR FOR TRANSPORTING ROLL CONTAINERS

BACKGROUND OF THE INVENTION

The conveyors for roll containers that are known so far lend themselves badly to the use on platforms where such roll containers are used for transporting postal articles that have to be transported from various places to different destinations and over unequal distances. These conveyors known so far occupy too much space and are generally only suited for taking up and delivering containers at fixed points. If this is not the case, the container has to be guided on its way.

SUMMARY OF THE INVENTION

This invention relates to an endless conveyor for transporting containers having two wheels located on one fixed axis, the supporting surface of the conveyor being at about the same height as the floor on which the containers are wheeled or rolled.

Conveyors of this type are used for example in department stores, on airfields and the like, where the differences of level that have to be bridged are not too great and/or the distances that have to be covered are not too long.

The invention provides a conveyor which retrieves the shortcomings of the known conveyors, thanks to the fact that the supporting surface, in cross-section, has the shape of a channel, so that the surface offers at least two points of support to each of the two wheels mentioned, and which is suited for transporting containers, of which the other wheels are of the swivelling type.

The visible part of the conveyor according to the invention is a channel of hardly one dm (decimeter) in width, which moves in the floor and on which the containers, with their wheels on a fixed axis, are placed transversely at arbitrary points, after which the containers are taken along by the conveyor. The swivel wheels adopt the direction of the channel and continue to run on the floor alongside of the conveyor. In the case of a collision with an obstacle the colliding containers leave the conveyor. Irrespective of their position the containers can be taken from the conveyor.

The endless channel can move in a vertical plane, in which case the lower part or return run further beneath the floor, can not, of course, be used for transporting containers. The endless channel can also move in a horizontal plane, in which case its whole length can be utilized.

In case the channel moves in only one plane, it can be mounted on a Galle's chain or roller chain. If the channel moves in more than one plane, for example in case there are a horizontal bend and at the same time a slope, use can be made of a cardan conveyor chain, of which the links are pivoting in their longitudinal direction with respect to one another. In the last-mentioned case a cable offers an alternative solution.

The channel can be made of flexible material, so that the bends and/or slopes can be followed. Rigid material, however, offers advantages with regard to robustness and wear resistance. According to a preferred embodiment the supporting surface of the conveyor is therefore divided into segments which have a length smaller than the distance between the two wheels on the fixed axis, and which are mounted on a chain or on a cable provided with driving means. In this way the trolley always rests on two segments, in consequence of which the bends are gone into and left more smoothly, and the chance of a container unexpectedly leaving the channel is considerably reduced.

BRIEF DESCRIPTION OF THE VIEWS

The above mentioned and other features, objects and advantages, and a manner of attaining them are described more specifically below by reference to an embodiment of this invention shown in the accompanying drawings, wherein:

FIG. 2 is an enlarged plan or top view of a roll container on a conveyor similar to that shown in FIG. 1, which conveyor is shown with wheel supporting channel segments;

FIG. 3 is a vertical cross-section of the conveyor shown in FIG. 2 showing the container thereon;

FIG. 4 is an enlarged vertical cross-section of the conveyor per se shown in FIG. 3 or taken along line IV—IV of FIG. 5, and FIG. 5 is a longitudinal sectional view of part of a conveyor segment taken along line V—V of FIG. 4.

DETAILED DESCRIPTION OF A PREFERRED EMBODIMENT

Figure 1:
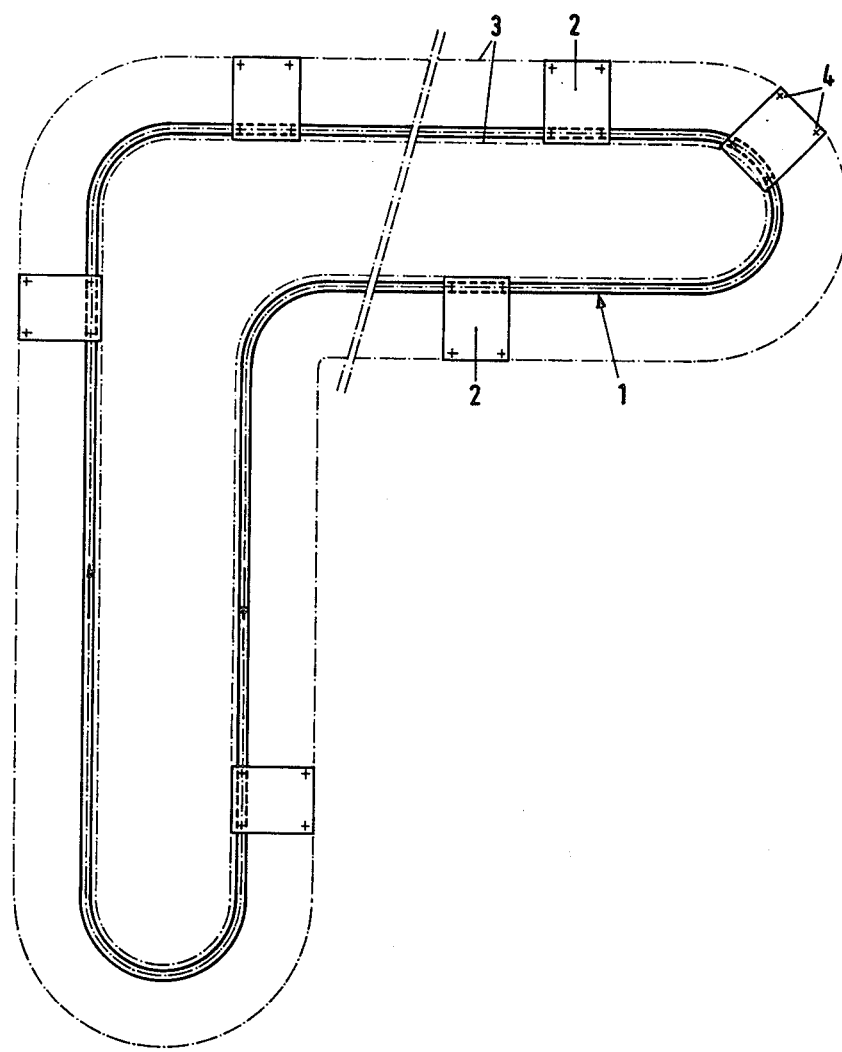
FIG. 1 is a schematic plan view of a conveyor path according to one embodiment of the invention with some roll containers shown at different positions along the path.

FIG. 1 shows a conveyor in the shape of a horizontal loop with the endless channel 1 of the conveyor being in the floor. On the outside of the channel 1 there are a number of roll containers 2 with their wheels on a fixed axis—called fixed wheels in what follows—placed at arbitrary points on the channel 1. The width of the path occupied and travelled by the roll containers 2 is indicated by the dot-dash lines 3. The positions of the swivel wheels are indicated by 4 adjacent the outer periphery of the path 3.

FIG. 2 shows a top view of a roll container 2 placed on a channel 1 divided into segments 5. The container has fixed wheels 6 and the swivelling wheels 7. A cross-section view according to FIG. 3 shows that the segments 5 are countersunk in the floor 8.

FIGS. 4 and 5 do not show the floor.

According to the embodiment as sketched in the FIGS. 3 and 4, the profile of the segments of the channel 5 is adapted to the dimension of the fixed wheels 6, though two points of support suffice. The segments of the channel 5 are mounted on a cardan conveyor chain 9. This chain consists of vertical and horizontal side plates of the links, 10 and 11, (see FIGS. 4 and 5) respectively, interconnected by means of universal joints in the joint planes 12, (see FIG. 5) which universal joints are but shown in FIGS. 4 and 5. The segments of the channel are mounted on the vertical side plate means 20 of the links 10 by means of the pins 13. The guide wheels 15 are mounted on the horizontal pivots 14 and the guide wheels 16 are mounted on the vertical pivots. With the help of these wheels the chain is guided along the profiled guiding wheel channel rails 17.

For a transport according to the invention the roll containers 2 do not require additional provisions.

The capacity of the conveyor is high, because the roll containers 2 can be placed side by side on the channel 1.

Thanks to the fact that the conveyor is countersunk in the floor 8, the whole surface of the floor 8 remains also available for other vehicles and people. If necessary one can pass the conveyor in a vehicle or on foot.

While there is described above the principles of this invention in connection with specific apparatus, it is to be clearly understood that this description is made only by way of example and not as a limitation to the scope of this invention.

What we claim is:

1. Endless conveyor for transporting wheeled containers on a floor, said containers having two wheels located on one fixed horizontal axis and at least one swivable wheel, the supporting surface of the conveyor being at about the same height as the floor on which the containers are supported, said conveyor supporting surface, having a concave channel shaped cross-section, so that both of said two wheels with one fixed horizontal axis are supported on said surface.

2. Endless conveyor, in accordance with claim 1, wherein the supporting surface of the conveyor is divided into segments which have a length smaller than the distance between said two wheels on the one fixed horizontal axis, and which segments are mounted on a swivably flexible linear driven means.

3. A conveyor for moving roll containers over a floor, said containers each having at least three spaced supporting wheels, two of which wheels are mounted on the same fixed horizontal axis and the other of which wheels are mounted to freely swivel about vertical axes, said conveyor comprising: an equally segmented concave channel movable along and countersunk in a slot in said floor, and a universally flexible linear means movable along said slot below said floor connected to said segments of said channel, whereby said two wheels mounted on the same horizontal axis of said container are transversely seatable in said channel on adjacent ones of said segments for moving said container over said floor along said slot as said linear means moves.

4. A conveyor according to claim 3 wherein said linear means comprises a cardan chain of links and said segments are connected to said links.

5. A conveyor according to claim 3 wherein said linear means comprises a cable.

6. A conveyor according to claim 3 wherein said linear means is guided by a pair of fixed channel rails along opposite sides of said slots below said floor.

7. A conveyor according to claim 6 wherein said linear means has roller means attached thereto at regularly spaced intervals rolling in said fixed channel rails.

8. A conveyor according to claim 3 wherein said linear means is endless and continuously moving.

* * * * *